Sept. 18, 1962  E. L. BURNER  3,054,295
METHOD AND APPARATUS FOR DETERMINING RATE OF PRESSURE CHANGE
Filed June 26, 1958

INVENTOR.
Eugene L. Burner
ATTORNEY

United States Patent Office 3,054,295
Patented Sept. 18, 1962

3,054,295
METHOD AND APPARATUS FOR DETERMINING RATE OF PRESSURE CHANGE
Eugene L. Burner, Morgantown, W. Va., assignor to United States of America as represented by the Secretary of the Interior
Filed June 26, 1958, Ser. No. 744,881
6 Claims. (Cl. 73—391)
(Granted under Title 35, U.S. Code (1952), sec. 266)

The invention herein described and claimed may be manufactured and used by or for the Government of the United States of America for governmental purposes without the payment of royalties thereon or therefor.

This invention relates to a method and apparatus for determining minute changes of pressure and for determining the rate of change of a varying pressure.

In many chemical and manufacturing processes it is necessary to determine the variation of some quantity in a system with respect to time and more particularly, the rate of change of the pressure. For example, the rate of feed of a fluidized solid to or from a reaction or storage vessel can be measured by supporting the vessel on a weighing cell, the weight being represented by a pressure impulse, to which it is directly proportional. By taking pressure readings at various time intervals the rate of flow of the powdered solid into or out of the vessel may be readily determined. Manual timing and reading, besides being subject to human error, gives no permanent record of the pressure changes. A pressure recorder obviates the latter defect, but may not give accurate results with small pressure changes.

It is an object of this invention to provide a method and apparatus for determining the rate of change of pressure.

It is a further object of this invention to provide a means for introducing a constant time interval into a pressure recording.

Other objects of this invention will appear from a consideration of the specification and claims.

In brief, my invention comprises a conventional differential pressure cell having a high pressure and low pressure chamber separated by a flexible, movable diaphragm. Unequal pressure impulses are transmitted to these chambers and the amount of resulting displacement of the diaphragm is a measure of the pressure difference. A valve in the pressure inlet line to one of the chambers opening and closing periodically at predetermined intervals introduces a time factor. This data may be recorded automatically and readily calculated from the resultant pressure versus time chart, wherein the time between pressure impulses is clearly defined.

The pressure impulse employed can come from a process as such, or from a pneumatic transmitter. By converting variables such as temperature, flow, weight, etc., into pressure impulses, small changes in these variables, or their time rate of changes may be measured, or employed for control purposes.

Figure 1:
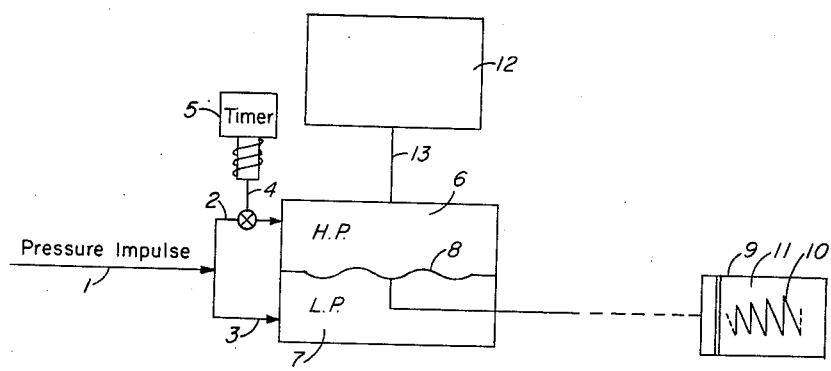
Figure 2:
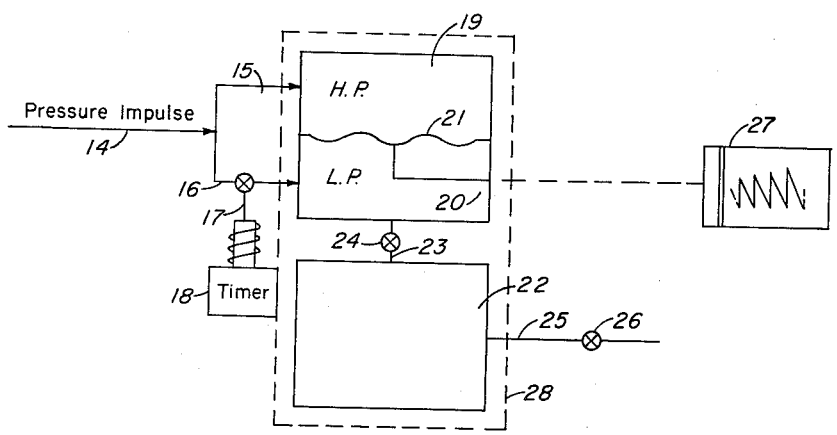
Figure 3:
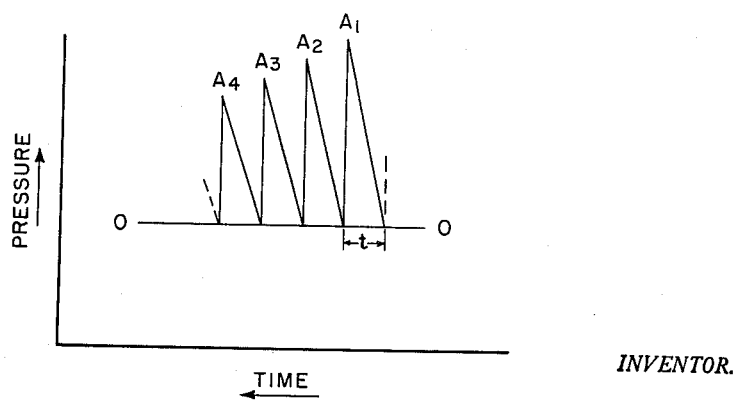

In the drawing:
FIGURE 1 is a schematic drawing of one form of this apparatus.
FIGURE 2 is a schematic drawing of a form of the invention adapted to pressures which vary above and below a reference pressure.
FIGURE 3 shows one form of a recording chart obtained from the apparatus shown in FIGURE 1.

Referring to FIGURE 1, a pressure impulse, which may come from a process as such, or from a pneumatic line connected to some instrument, is conducted through line 1 into lines 2 and 3 which lead into chambers 6 and 7 of a differential pressure cell separated by flexible diaphragm 8. A conventional recorder 9 is operatively connected to diaphragm 8, the trace 10 of the pressure appearing on chart 11. Assuming the pressure to be decreasing, then chamber 6 is the high pressure chamber and chamber 7 the low pressure. Solenoid valve 4 operated by timer 5 is in line 2 to control the transmission of pressure impulse into high pressure chamber 6. With valve 4 open, the pressure is the same on both sides of the diaphragm. The resulting trace on the pressure chart is the datum pressure. Valve 4 is then closed, trapping the pressure in high pressure chamber 6. Line 3 is open, and the pressure impulse enters low pressure chamber 7. As the pressure falls, the diaphragm becomes deflected, and this is recorded as a change of pressure on recorder 9.

Timer 5 is connected to solenoid valve 4 to close off line 2 at predetermined intervals. When the valve 4 is open, the pressure equalizes on both sides of the diaphragm, and the recorder returns to the datum. Subsequently, as the valve 4 closes with the originating pressure falling, the diaphragm again is deflected because of the difference in force on its opposite surfaces, and this is recorded in the pressure recorder as a change in pressure.

Volume chamber 12 is connected to chamber 6 by line 13 to increase the accuracy of the device by minimizing the percentage changes of volume due to movement of diaphragm 8.

The modification of FIGURE 2 shows the differential pressure device adapted to measure pressures that may vary above a datum value as well as below. The process pressure impulse is led via lines 14, 15, and 16 into the hight pressure and low pressure chambers 19 and 20 of a differential pressure cell, which are separated by diaphragm 21. Solenoid valve 17 and timer 18 are similar to valve and timer 4 and 5 of FIGURE 1. Volume chamber 22, similar to chamber 12 of FIGURE 1, is connected to chamber 20 by line 23 having therein a valve 24, which may be a solenoid valve like valve 4 of FIGURE 1.

Chamber 22 is connected to the atmosphere by a line 25 having therein a valve 26. Recorder 27, similar to recorder 9 of FIGURE 1, is operatively connected to diaphragm 21. The portion of the apparatus within the dotted line 28 can be kept at a constant temperature, as by thermostatically controlled heating, to reduce or eliminate any errors due to changes in temperature.

With valve 24 closed, and 17 and 26 open, process pressure is fed to chambers 19 and 20 via lines 14, 15, and 16. Valves 17 and 26 are then closed, thereby trapping air in volume chamber 22 at atmosphere pressure, and pressure in chamber 20 at process pressure level. At this moment, the pressure indication is zero since there is no diaphragm deflection. Valve 24 is then opened, joining chamber 22 to 20. This lowers the trapped pressure by an amount depending on the ratio of volumes of the two chambers, thereby causing an unbalance of forces in the diaphragm. With chamber 22 about the same volume as 20, the pressure in the latter is reduced to roughly one-half. The reading on the recorder now obtained is the datum pressure, and pressure readings can be taken both above and below this value.

A portion of a typical pressure graph produced by the apparatus of FIGURE 1, where the pressure is decreasing, is shown in FIGURE 3. The datum line is O—O, $t$ is the time cycle between the closing and opening of valve 4, $A_1$, $A_2$—$A_4$ are the peak pressure readings obtained. The rate of change may be readily calculated by subtracting $A_2$ from $A_1$, and dividing by $t$.

I claim:
1. Apparatus for determining the rate of change of a varying pressure, including a differential pressure cell having a pair of chambers separated by a diaphragm, said diaphragm being capable of movement in response to pressure thereon, conduit means for conducting a fluid pressure impulse, inlets in said chambers connected to said conduit means, operative valve means in only one of said inlets, means adapted to open and close said valve means at predetermined time intervals, means for sensing the movement of the diaphragm to obtain repeatedly in sequence indications representative of a datum pressure when the valve means is open, followed by indications representative of the pressure of the impulse when the valve means is closed, whereby a rate of change in pressure during a time interval between impulse pressure indications, each such interval being substantially equal to a said predetermined time interval, may be determined from the difference of two consecutive impulse pressures divided by the aforesaid time interval.

2. Apparatus for determining the rate of change of a decreasing pressure which comprises, a differential pressure cell having a high pressure and a low pressure chamber separated by a diaphragm, said diaphragm being capable of movement in response to pressure thereon, a first conduit means for transmitting a fluid pressure impulse, second and third conduit means connecting said first conduit means to said high and low pressure chambers, respectively, operative valve means in said second conduit means only, means adapted to open and close said valve means at predetermined time intervals, means for sensing the movements of the diaphragm to obtain repeatedly in sequence indications representative of a datum pressure when the valve means is open, followed by indications representative of the pressure of the impulse when the valve means is closed, whereby a rate of change in pressure during a time interval between impulse pressure indications, each such interval being substantially equal to a said predetermined time interval, may be determined from the difference of two consecutive impulse pressures divided by the aforesaid time interval.

3. Apparatus for determining the rate of change of an increasing pressure which comprises, a differential pressure cell having a high pressure and a low pressure chamber separated by a diaphragm, said diaphragm being capable of movement in response to pressure thereon, a first conduit means for transmitting a fluid pressure impulse, second and third conduit means connecting said first conduit means to said high and low pressure chambers, respectively, operative valve means in said third conduit means only, means adapted to open and close said valve means at predetermined time intervals, means for sensing the movements of the diaphragm to obtain repeatedly in sequence indications representative of a datum pressure when the valve means is open, followed by indications representative of the pressure of the impulse when the valve means is closed, whereby a rate of change in pressure during a time interval between impulse pressure indications, each such interval being substantially equal to a said predetermined time interval, may be determined from the difference of two consecutive impulse pressures divided by the aforesaid time interval.

4. Apparatus for measuring the rate of change of varying pressure which comprises, a differential pressure cell having a high pressure and a low pressure chamber separated by a diaphragm, said diaphragm being capable of movement in response to pressure thereon, a third chamber having about the same volume as one of said pressure cell chambers, first conduit means, including valve means, connecting said third chambers to said one pressure cell chambers, means including valve means for venting said third chamber to the atmosphere, second conduit means for transmitting a fluid pressure impulse, third and fourth conduit means for connecting said second conduit means to said one pressure cell chamber and to the other pressure cell chamber, respectively, valve means in the third conduit means, means adapted to open and close the latter valve means at predetermined time intervals, means for sensing the movement of the diaphragm to obtain an indication representative of a datum pressure when the second and said latter mentioned valve means is opened, and to thereafter obtain repeatedly in sequence indications representative of the pressure of the impulse when after an aforesaid predetermined time interval the said latter mentioned valve means is opened, followed by indications representative of the datum pressure when after the said time interval the said latter mentioned valve means is closed, whereby a rate of change in pressure during a time interval between impulse pressure indications, each such interval being substantially equal to the said time interval, may be determined from the difference of two consecutive impulse pressure indications divided by the said time interval.

5. Apparatus for determining the rate of change of a varying pressure, including a differential pressure cell having a pair of chambers separated by a diaphragm, said diaphragm being capable of movement in response to pressure thereon, conduit means for conducting a fluid pressure impulse, inlets in said chambers connected to said conduit means, operative valve means in one of the inlets, the other being unobstructed for the passage of the fluid impulse, means adapted to open and close said valve means at predetermined intervals, means for sensing the movement of the diaphragm to obtain repeatedly in sequence indications representative of a datum pressure when the valve means is open, followed by indications representative of the pressure of the impulse when the valve means is closed, whereby a rate of change in pressure during a time interval between impulse pressure indications, each such interval being substantially equal to a said predetermined time interval, may be determined from the difference of two consecutive impulse pressures divided by the aforesaid time interval.

6. Apparatus for determining the rate of change of a varying pressure, including a differential pressure cell having a pair of chambers separated by a diaphragm, said diaphragm being capable of movement in response to pressure thereon, conduit means for conducting a fluid pressure impulse, inlets in said chambers connected to said conduit means, operative valve means in one of the inlets, the other being unobstructed at all times for the passage of the fluid impulse, means adapted to open and close said valve means at predetermined intervals, means for sensing the movement of the diaphragm to obtain repeatedly in sequence indications representative of a datum pressure when the valve means is open, followed by indications representative of the pressure of the impulse when the valve means is closed, whereby a rate of change in pressure during a time interval between pressure indications, each such interval being substantially equal to a said predetermined time interval, may be determined from the difference of two consecutive impulse pressures divided by the aforesaid time interval.

References Cited in the file of this patent

UNITED STATES PATENTS

| | | |
|---|---|---|
| 1,098,931 | Akimoff | June 2, 1914 |
| 1,381,139 | Smoot | June 14, 1921 |
| 1,997,412 | Fischel | Apr. 9, 1935 |
| 2,648,041 | Perkins | Aug. 4, 1953 |
| 2,681,563 | Golden | June 22, 1954 |
| 2,735,368 | Antonazzi | Feb. 21, 1956 |
| 2,775,122 | Smith et al. | Dec. 25, 1956 |
| 2,819,615 | Colt | Jan. 14, 1958 |

FOREIGN PATENTS

| | | |
|---|---|---|
| 952,846 | Germany | Nov. 22, 1956 |